United States Patent
Tanaka et al.

[15] 3,642,576
[45] Feb. 15, 1972

[54] PROCESS FOR PRODUCING L-GLUTAMIC ACID AND ALPHA-KETOGLUTARIC ACID

[72] Inventors: Katsunobu Tanaka; Kazuo Kimura, both of Machida-shi; Ken Yamaguchi, Tokyo, all of Japan

[73] Assignee: Kyowa Hakko Kogyo Co., Ltd., Tokyo, Japan

[22] Filed: July 10, 1968

[21] Appl. No.: 743,644

Related U.S. Application Data

[63] Continuation of Ser. No. 478,725, Aug. 10, 1965, abandoned.

[30] Foreign Application Priority Data

Aug. 18, 1964 Japan...................................39/45851
Aug. 18, 1964 Japan...................................39/45852
Aug. 18, 1964 Japan...................................39/45853
Aug. 18, 1964 Japan...................................39/45854

[52] U.S. Cl. ............................................................195/28 R
[51] Int. Cl. ...............................................................C12d 13/06
[58] Field of Search......................195/28, 29, 3, 3 H, 47, 30

[56] References Cited

UNITED STATES PATENTS 3,120,472  4/1964   Dunn et al. ...........................195/47
3,222,258  12/1965  Iizuka et al. ..........................195/29

OTHER PUBLICATIONS

Shio et al., Journal General Applied Microbiology Vol. 9 No. 1 pages 23-30 (1963)

*Primary Examiner*—Lionel M. Shapiro
*Attorney*—Craig, Antonelli, Stewart & Hill

[57] ABSTRACT

A process for producing L-glutamic acid and alpha-ketoglutaric acid. A micro-organism of *Micrococcus paraffinolyticus, Brevibacterium ketoglutamicum, Arthrobacter roseoparaffinus,* or *Arthrobacter hydrocarboglutamicus* is cultured under aerobic conditions in an aqueous nutrient medium containing one or more of the normal-paraffins as the major source of carbon.

35 Claims, No Drawings

PROCESS FOR PRODUCING L-GLUTAMIC ACID AND ALPHA-KETOGLUTARIC ACID

CROSS-REFERENCE TO RELATED APPLICATION

This application is a continuation of copending application Ser. No. 478,725, filed on Aug. 10, 1965.

This invention relates to the preparation of L-glutamic acid and alpha-ketoglutaric acid. More particularly, it relates to a process for the preparation of L-glutamic acid and alpha-ketoglutaric acid by fermentation. Even more particularly, the invention relates to a process for producing L-glutamic acid and alpha-ketoglutaric acid by fermentation of a nutrient medium containing hydrocarbons as the carbon source and using novel strains of micro-organisms.

After extensive investigations, the present inventors have isolated micro-organisms having mycological properties which are exceedingly different from those of known micro-organisms and which are capable of producing L-glutamic acid and alpha-ketoglutaric acid from hydrocarbons in extremely high yields.

One of the objects of the present invention is to provide a process for producing L-glutamic acid and alpha-ketoglutaric acid by a fermentation method.

Another object of the present invention is to provide a process for the preparation of L-glutamic acid and alpha-ketoglutaric acid in high yield.

Still another object of the present invention is to provide a process for the preparation of L-glutamic acid and alpha-ketoglutaric acid by fermentation using novel strains of micro-organisms.

These and other objects of the present invention will become apparent to those skilled in the art from a reading of the following specification and claims.

In accordance with the present invention, it has been found that L-glutamic acid and alpha-ketoglutaric acid may be produced in extremely high yields from hydrocarbons by using micro-organisms selected from the group consisting of *Micrococcus paraffinolyticus*, *Brevibacterium ketoglutamicum*, *Arthrobacter roseoparaffinus* and *Arthrobacter hydrocarboglutamicus*.

The aforementioned micro-organisms found to be useful in the process of the present invention are novel strains of micro-organisms having mycological properties not only exceedingly different from those of known micro-organisms requiring hydrocarbons for their growth but also clearly different from any other kinds of known micro-organisms. As indicated above, the genera of these micro-organisms have been determined as *Micrococcus*, *Brevibacterium* and *Arthrobacter*, respectively, from properties hereinafter disclosed in accordance with the identification and classification procedures set forth in Bergey's Manual of Determinative Bacteriology, seventh Edition. However, as for the species of these micro-organisms, no corresponding ones in each genus have been found even with strict comparative investigations. Thus, the micro-organisms utilized in the present invention are judged as being novel kinds of micro-organisms and are named in accordance with their identification as *Micrococcus paraffinolyticus*, *Brevibacterium ketoglutamicum*, *Arthrobacter roseoparaffinus* and *Arthrobacter hydrocarboglutamicus*, respectively.

The novel micro-organisms described herein have been deposited with the American Type Culture Collection and have been assigned the following catalog numbers:

*Micrococcus paraffinolyticus* No. 41—ATCC No. 15589
*Brevibacterium ketoglutamicum* No. 2439—ATCC No. 15587
*Arthrobacter roseoparaffinus* No. 1661–ATCC No. 15584
*Arthrobacter hydrocarboglutamicus* No. 2389—ATCC No. 15583

The mycological properties of the above-mentioned novel micro-organisms are as follows:

I. *Micrococcus paraffinolyticus*. No. 41—ATCC No. 15589
Morphological properties:
  1. Shape: spheres or short rods
  2. Size: 0.8–1.2 micron x 0.8–1.4 micron
  3. Movement property: nonmotile
  4. Stain: gram-positive
Culturing properties:
  1. Nutrient agar colonies: scanty growth
  2. Nutrient agar slant: scanty growth, filiform, glistening, light red or red orange, butyrous
  3. Nutrient broth: slightly turbid, compact sediment
Biological properties:
  1. Optimum temperature: 25°–37° C.
  2. Optimum pH: 6.0–8.0
  3. Oxygen requirement: Aerobic to facultatively anaerobic
  4. Litmus milk: no change
  5. Gelatin liquefaction: none
  6. Hydrogen sulfide is not produced.
  7. Indole is not produced.
  8. Starch is not decomposed.
  9. Nitrate is reduced to nitrite.
  10. Catalase: positive
  11. The growth is excellent with the use of n-paraffin as a sole source of carbon-producing amino acid and carboxylic acid, particularly L-glutamic acid and alpha-ketoglutaric acid.
  12. Utilization of sugar: Acid is formed from fructose.
  13. The production of acid is scanty from glucose and mannose. No acid is produced from sucrose.

When the above-mentioned mycological properties are compared with those of known micro-organisms requiring hydrocarbons for their growth and with those described in Bergey's Manual of Determinative Bacteriology, there is found none corresponding to these properties and, accordingly, it is determined to be a different micro-organism.

II. *Brevibacterium ketoglutamicum*, No. 2473—ATCC No. 15588
Morphological properties:
  1. Shape: usually rods; rarely long cells are observed; spore not formed
  2. Size: 0.7–0.9 micron x 0.8–3.0 micron
  3. Movement property: nonmotile
  4. Grams stain: gram-positive
Culturing properties
  1. Nutrient agar colonies: punctiform, smooth, entire, opaque and glistening
  2. Nutrient agar slant: moderate growth, filiform, glistening, pink orange, butyrous
  3. Nutrient broth: slightly turbid, membranous on the surface, compact sediment
Biological properties:
  1. Optimum temperature: 25°–37° C. At a temperature of 37° C., the growth is abundant.
  2. Optimum pH; 6.0–8.0
  3. Oxygen requirement: aerobic to facultatively anaerobic
  4. Litmus milk is not changed or is changed to alkaline
  5. Gelatin liquefaction: none
  6. Hydrogen sulfide is not produced.
  7. Indole is not produced.
  8. Starch is not decomposed.
  9. Nitrate is reduced to nitrite.
  10. Catalase: positive
  11. Urease: positive
  12. The growth is excellent with the use of N-paraffins as a sole source of carbon, producing alpha-ketoglutaric acid, L-glutamic acid and alanine.
  13. Utilization of sugars: The production of acid is slight and weak from glucose, fructose or sucrose. Maltose is not utilized.

As evident from the foregoing description, this micro-organism has a color tone, a state of growth and an optimum temperature for growth which are exceedingly different from those of known micro-organisms. Hence, it is judged to be a novel micro-organism.

III. *Arthrobacter roseoparaffinus*, No. 1661—ATCC No. 15584

Morphological properties:
1. Shape: usually short rods. The cells vary in size and shape, and spherical, elliptical and elongated cells are observed.
2. Size: 0.5–0.7 micron x 0.5–3.0 micron
3. Movement property: motile
4. Grams stain: gram-negative Culturing properties:
1. Nutrient agar slant: moderate growth, filiform, glistening, pinkish orange, butyrous
2. Nutrient broth: slightly turbid, no growth on the surface, slightly compact sediment, and physiological characteristics Biological properties:
1. Optimum temperature: 25 –37 C.
2. Optimum pH: 6.0–8.0
3. Oxygen requirement: Aerobic to facultatively anaerobic
4. Litmus milk is not changed.
5. Gelatin liquefaction: crateriform
6. Hydrogen sulfide is not produced.
7. Indole is not produced.
8. Starch is not decomposed.
9. Nitrate is not reduced to nitrite.
10. Catalase: positive
11. Urease: positive
12. The growth is excellent with the use of n-paraffins as a sole source of carbon, producing amino acid and carboxylic acid, particularly L-glutamic acid and alpha-ketoglutaric acid, respectively.
13. Utilization of sugar: The production of acid is scanty from glucose, fructose of sucrose.
14. Formation of ammonia (bouillon culture); negative As is evident from the foregoing description, this micro-organism has properties exceedingly different from those of known micro-organisms requiring hydrocarbons for their growth, particularly with respect to the important characteristics such as color tone, movement property, Grams stain, gelatin liquification power and utilization of sugar.

Also, no acid formation is observed from sorbitol and mannitol besides the sugars mentioned above.

IV. *Arthrobacter hydrocarboglutamicus*, No. 2389—ATCC No. 15583

Morphological properties:
1. Shape: spheres or short rods. The cells vary in size and shape, and elongated cells are observed,
2. Size: 0.5–0.8 micron x 1–3.0 micron
3. Movement properties: nonmotile
4. Grams stain: gram-positive Culturing properties:
1. Nutrient agar colonies: moderate growth, circular, smooth, entire, convex, opaque
2. Nutrient agar slant: moderate growth, filiform, glistening, light orange, butyrous
3. Nutrient broth: slightly turbid, membranous on the surface, moderately flaky sediment, and physiological characteristics Biological properties:
1. Optimum temperature: 20°–30° C.
2. Optimum pH: 6.0–8.0
3. Oxygen requirement: Aerobic to facultatively anaerobic
4. Litmus milk: acidic
5. Gelatine liquefaction: none
6. Hydrogen sulfide is not produced.
7. Indole is not produced.
8. Starch is not decomposed.
9. Nitrate is not reduced to nitrite.
10. Catalase: positive
11. Urease: positive
12. The growth is excellent with the use of n-paraffins as a sole source of carbon, producing alpha-ketoglutaric acid and L-glutamic acid.
13. Utilization of sugar: Acids are formed from glucose, fructose, sucrose and maltose.

As is evident from the foregoing description, this micro-organism has properties exceedingly different from those of known micro-organisms with respect to the characteristics of litmus milk reaction, utilization of sugar and the like.

All of the above-mentioned novel micro-organisms can be grown well in a medium which contains a hydrocarbon, inorganic salts and nitrogen source. The addition of a slight amount of an organic nitrogen source, such as corn steep liquor or meat extract, promotes the growth of the micro-organisms to a great extent. As nitrogen source, an ammonium salt such as ammonium sulfate, ammonium nitrate, ammonium chloride, ammonium carbonate or the like and/or urea can be used effectively. When the production of L-glutamic acid is the main object, it is necessary to control the pH of the fermentation medium so that it always remains in the range of 6 to 8 by properly supplying thereto one or more than one of the above-mentioned sources of nitrogen.

As the hydrocarbon source to be employed in culturing the novel micro-organisms of the present invention, n-paraffins having from 11–18 carbon atoms are preferred. A single n-paraffin or a mixture of more than one of these n-paraffins, or a mixture of one or more than one of these n-paraffins with another carbon source wherein the n-paraffin is the major constituent, may be used. Normal-paraffins within the above-mentioned carbon-number range include n-undecane, n-dodecane, n-tridecane, n-tetradecane, n-pentadecane, n-hexadecane, n-heptadecane and n-octadecane and mixtures thereof.

Other details of culturing are conventional and well known to those skilled in the art. For example, other carbon sources which may be utilized in minor amount include carbohydrates, e.g., glucose, starch hydrolysate, molasses, etc., or other conventional carbon sources. Inorganic salts, besides those mentioned above, which may be employed include potassium phosphate, magnesium sulfate, manganese sulfate, potassium chloride, ferrous sulfate, calcium carbonate, etc. Other conventional sources of nitrogen which may be employed include yeast extract, peptone, fishmeal, etc. Also, nutrients such as amino acids, e.g., aspartic acid, glutamic acid, threonine, methionine, etc., and/or vitamins, e.g., biotin, thiamine, cobalamin, etc., may be added to the medium.

The n-parraffins may be added to the medium in the amount of from about 5.0 to 15.0 percent by weight. The fermentation is preferably carried out at a culture temperature of from 25° to 38° C. and at a pH of from 6.0 to 9.0.

After completion of the fermentation process, the L-glutamic acid and alpha-ketoglutaric acid may be recovered by conventional methods, such as with an ion exchange resin or by centrifugation.

The acids produced by the process of the present invention have great utility, as known to those skilled in the art, for example, the monosodium salt of L-glutamic acid is widely used as a flavor enhancer while alpha-ketoglutaric acid is used as a precursor in the synthesis of L-glutamic acid.

The following examples are given merely as illustrative of the present invention and are not to be considered as limiting. Unless otherwise indicated, the percentages set forth therein are by weight.

EXAMPLE 1

Twenty ml. of fermentation medium containing 0.2% of $KH_2PO_4$, 0.1% of $MgSO_4 \cdot 7H_2O$, 0.002% of $MnSO_4 \cdot 4H_2O$, 0.02% of $FeSO_4 \cdot 7H_2O$, 2.0% of $NH_4NO_3$, 2.0% of $CaCO_3$, 0.01 percent of corn steep liquor and 8.0 percent of n-tetradecane (the $NH_4NO_3$ and n-tetradecane were sterilized by steam individually) was poured into a 500ml. Sakaguchi flask. A seed culture of *Micrococcus paraffinolyticus* No. 41 (ATCC No. 15589) prepropagated on bouillon medium for 24 hours was inoculated in a proportion of 5 percent into the above-mentioned medium and subjected to a shaking culture at a temperature of 30° C. for 4 days with a reciprocating motion of 130 times per minute whereby the quantity of alpha-ketoglutaric acid reached 42 mg./ml. in the culture medium liquor.

The cells of bacteria wee separated with a centrifuge. The pH of the resulting cultured liquor was adjusted to 9.0 by the addition of $Ca(OH)_2$. After having been concentrated and left to stand in a cold place, crystals of calcium alpha-ketoglutarate separated and 0.87 g. of the calcium alpha-ketoglutarate was obtained easily from the cultured liquor by centrifugal separation.

EXAMPLE 2

Twenty ml. of fermentation medium containing 0.2% of $KH_2PO_4$, 0.1% of $MgSO_4\cdot 7H_2O$, 0.002% of $MnSO_4\cdot 4H_2O$, 0.02% of $FeSO_4\cdot 7H_2O$, 2.0% of $NH_4NO_3$, 2.0% of $CaCO_3$, 0.01% of corn steep liquor, and 8.0% of a mixture of n-dodecane, n-tridecane, and n-tetradecane, each in equal volume, (the $NH_4NO_3$ and the hydrocarbon mixture were sterilized by steam individually) was poured into a 500ml. Sakaguchi flask. A seed culture of *Micrococcus paraffinolyticus* No. 41 (ATCC No. 15589) prepropagated on bouillon medium for 24 hours was inoculated in a proportion of 5 percent into the above-mentioned medium and subjected to a shaking culture at a temperature of 30° C. with a reciprocating motion of 130 times per minute. During the culturing, the pH was always maintained within the range of 7.0–8.0 by supplying 20% $(NH_4)_2CO_3$ thereto. The amounts of L-glutamic acid and alpha-ketoglutaric acid formed in the culture medium liquor after 4 days of culturing were 22 and 23 mg./ml, respectively.

After separating the cells of bacteria by centrifugal separation, the filtrate of the culture medium liquor, freed of $CaSO_4$ precipitate by adjusting the pH to 2.0 with sulfuric acid, was subjected to an adsorption and desorption treatment with an ion exchange resin in a conventional manner whereby 0.4 g. of L-glutamic acid crystals and 0.4 g. of alpha-ketoglutaric acid crystals were obtained.

EXAMPLE 3

Twenty ml. of fermentation medium containing 0.2% of $K_2HPO_4$, 0.1% of $MgSO_4\cdot 7H_2O$, 0.002% of $MnSO_4\cdot 4H_2O$, 0.02% of $FeSO_4\cdot 7H_2O$, 2.0% of $NH_4NO_3$, 3.0% of $CaCO_3$, 0.01 of corn steep liquor, and 8.0 percent of a mixture of $C_{11}$ to $C_{18}$ n-paraffins was poured into a 500-ml. Sakaguchi flask (The $NH_4NO_3$ and the hydrocarbon mixture were sterilized by steam individually). A seed culture of *Brevibacterium ketoglutamicum* No. 2439 (ATCC No. 15587) prepropagated on bouillon medium for 24 hours was inoculated into the above-mentioned medium in a proportion of 5.0 percent and subjected to a shaking culture at a temperature of 30° C. for 4 days with a reciprocating motion of 130 times per minute. During the culturing, the pH of the fermented liquor was adjusted to 6.0–8.0 by supplying urea or aqueous ammonia thereto. At the end of the culturing, 10 mg./ml. of L-glutamic acid and 30 mg./ml. of alpha-ketoglutaric ketoglutaric acid were found to be accumulated in the culture liquor.

150 mg. of L-glutamic acid crystals and 400 mg. of alpha-ketoglutaric acid crystals were obtained from 20 ml. of the fermented liquor by means of a conventional separation step.

EXAMPLE 4

Twenty ml. of fermentation medium containing 0.2% of $KH_2PO_4$, 0.1% of $MgSO_4\cdot 7H_2O$, 0.002% of $MnSO_4\cdot 4H_2O$, 0.02% of $FeSO_4\cdot 7H_2O$, 2.0% of $NH_4NO_3$, 2.0% of $CaCO_3$, 0.01% of corn steep liquor and 8.0 percent of n-tetradecane (the $NH_4NO_3$ and n-tetradecane were sterilized by steam individually) was poured into a 500-mil. Sakaguchi flask. A seed culture of *Arthrobacter roseoparaffinus* No. 1661 (ATCC No. 15584) prepropagated on bouillon medium for 24 hours was inoculated into the above-mentioned medium in a proportion of 5.0 percent and subjected to a shaking culture at a temperature of 30° C. for 4 days with a reciprocating motion of 130 times per minute. The filtrate of the culture medium liquor, freed of cells of bacteria by centrifugal separation, was concentrated after adjusting the pH to 9.0 with $Ca(OH)_2$ and allowed to stand in a cold place, whereby crystals of the calcium salt of alpha-ketoglutaric acid precipitated therefrom. Subsequently, 0.92 g. of calcium alpha-ketoglutarate crystals was obtained by centrifugal separation.

EXAMPLE 5

Twenty ml. of fermentation medium containing 0.2% of $KH_2PO_4$, 0.1% of $MgSO_4\cdot 7H_2O$, 0.002% of $MnSO_4\cdot 4H_2O$, 0.02% of $FeSO_4\cdot 7H_2O$, 2.0% of $NH_4NO_3$, 2.0% of $CaCO_3$, 0.01 percent of corn steep liquor and 8.0 percent of an equal volume mixture of n-dodecane, n-tridecane and n-tetradecane (the $NH_4NO_3$ and the hydrocarbon mixture were sterilized by steam individually) was poured into a 500ml. Sakaguchi flask. A seed culture of *Arthrobacter roseoparaffinus* No. 1661 (ATCC No. 15584) prepropagated on bouillon medium for 24 hours was inoculated into the above-mentioned medium in a proportion of 5.0 percent and subjected to a shaking culture at a temperature of 30° C. with a reciprocating motion of 130 times per minute. During the culturing, the pH was maintained at 7.0–8.0 by supplying 2.0% $(NH_4)_2CO_3$ thereto. After culturing for 4 days, the cells of bacteria were separated by centrifugal separation. The pH of the filtrate of the culture medium liquor was adjusted to 2.0 by the addition of $H_2SO_4$ and the precipitate of $CaSO_4$ was eliminated therefrom. The liquor was passed through a column packed with Amberlite IR 120 (H-type) ion exchange resin. The adsorbed L-glutamic acid was eluted with aqueous ammonia, the ammonia was removed from the eluate at a reduced pressure, and the pH of the liquor was adjusted to 3.0 with hydrochloric acid.

After the resulting liquor was kept in a cold place, L-glutamic acid crystals separated therefrom and 0.55 g. of L-glutamic acid crystals was obtained easily. Also, 0.21 g. of the calcium salt of alpha-ketoglutaric acid was obtained from the first portion of effluent from the ion exchange resin by the same process as described in example 4.

EXAMPLE 6

Twenty ml. of fermentation medium containing 0.2% of $K_2HOP_4$, 0.1% of $MgSO_4\cdot 7H_2O$, 0.002% of $MnSO_4\cdot 4H_2O$, 0.02% of $FeSO_4\cdot 7_2O$, 2.0% of $NH_4NO_3$, 3.0% of $CaCO_3$, 0.01 percent of corn steep liquor and 8.0 percent of a mixture of $C_{11}$ to $C_{18}$ n-paraffins (the $NH_4NO_3$ and the n-paraffin mixture were sterilized by steam individually) was poured into a 500ml. Sakaguchi flask. A seed culture of *Arthrobacter hydrocarboglutamicus* No. 2389 (ATCC No. 15583) prepropagated on bouillon medium for 24 hours was inoculated into the above-mentioned medium in a proportion of 5.0 percent and subjected to a shaking culture at a temperature of 30° C. for 4 days with a reciprocating motion of 130 times per minute. The pH of the fermented liquor was adjusted to 6.0–8.0 during the time of the culturing by supplying urea or ammonia thereto. At the end of the culturing, 6 mg./ml. of L-glutamic acid and 29 mg./ml. of alpha-ketoglutaric acid were accumulated in the culture liquor. From 20 ml. of this fermented liquor, 100 mg. of L-glutamic acid crystals and 406 mg. of alpha-ketoglutaric acid crystals were obtained.

The invention being thus described, it will be obvious that the same may be varied in many ways. Such variations are not to be regarded as a departure from the spirit and scope of the invention and all such modifications as would be obvious to one skilled in the art are intended to be included herein.

What we claim is:

1. A process for producing L-glutamic acid and alpha-ketoglutaric acid which comprises culturing a micro-organism selected from the group consisting of *Micrococcus paraffinolyticus*, *Brevibacterium ketoglutamicum*, *Arthrobacter roseoparaffinus* and *Arthrobacter hydrocarboglutamicus* under aerobic conditions in an aqueous nutrient medium containing at least one normal-paraffin as the major source of carbon, and recovering the L-glutamic acid and alpha-ketoglutaric acid thus produced.

2. The process of claim 1, wherein said normal-paraffin contains from 11 to 18 carbon atoms.

3. The process of claim 1, wherein the pH of said medium is maintained at from 6 to 8.

4. The process of claim 1, wherein a source of nitrogen is added to said medium to increase the yield of said L-glutamic acid.

5. A process for producing L-glutamic acid and alpha-ketoglutaric acid which comprises culturing a micro-organism selected from the group consisting of *Micrococcus paraffinolyticus*, *Brevibacterium ketoglutamicum*, *Arthrobacter roseoparaffinus* and *Arthrobacter hydrocarboglutamicus* under aerobic conditions in an aqueous nutrient medium containing a source of nitrogen and at least one normal-paraffin as the major source of carbon, and recovering the L-glutamic acid and alpha-ketoglutaric acid thus produced.

6. The process of claim 5, wherein said normal-paraffin contains from 11 to 18 carbon atoms.

7. The process of claim 5, wherein an organic nitrogen source selected from the group consisting of corn steep liquor and meat extract is added to said medium to promote the growth of the culture.

8. A process for producing L-glutamic acid and alpha-ketoglutaric acid which comprises culturing the micro-organism *Micrococcus paraffinolyticus* under aerobic conditions in an aqueous nutrient medium containing at least one normal-paraffin as the major source of carbon, and recovering the L-glutamic acid and alpha-ketoglutaric acid thus produced.

9. The process of claim 8, wherein said normal-paraffin contains from 11 to 18 carbon atoms.

10. The process of claim 8, wherein the pH of said medium is maintained at from 6.0 to 8.0.

11. The process of claim 8, wherein a source of nitrogen is added to said medium to increase the yield of said L-glutamic acid.

12. A process for producing L-glutamic acid and alpha-ketoglutaric acid which comprises culturing the micro-organism *Micrococcus paraffinolyticus* under aerobic conditions in an aqueous nutrient medium containing a source of nitrogen and at least one normal-paraffin as the major source of carbon, and recovering the L-glutamic acid and alpha-ketoglutaric acid thus produced.

13. The process of claim 12, wherein said normal-paraffin contains from 11 to 18 carbon atoms.

14. The process of claim 12, wherein an organic nitrogen source selected from the group consisting of corn steep liquor and meat extract is added to said medium to promote the growth of the culture.

15. A process for producing L-glutamic acid and alpha-ketoglutaric acid which comprises culturing the micro-organism *Brevibacterium ketoglutamicum* under aerobic conditions in an aqueous nutrient medium containing at least one normal-paraffin as the major source of carbon, and recovering the L-glutamic acid and alpha-ketoglutaric acid thus produced.

16. The process of claim 15, wherein said normal-paraffin contains from 11 to 18 carbon atoms.

17. The process of claim 15, wherein the pH of said medium is maintained at from 6 to 8.

18. The process of claim 15, wherein a source of nitrogen is added to said medium to increase the yield of said L-glutamic acid.

19. A process for producing L-glutamic acid and alpha-ketoglutaric acid which comprises culturing the micro-organism *Brevibacterium ketoglutamicum* under aerobic conditions in an aqueous nutrient medium containing a source of nitrogen and at least one normal-paraffin as the major source of carbon, and recovering the L-glutamic acid and alpha-ketoglutaric acid thus produced.

20. The process of claim 19, wherein said normal-paraffin contains from 11 to 18 carbon atoms.

21. The process of claim 19, wherein an organic nitrogen source selected from the group consisting of corn steep liquor and meat extract is added to said medium to promote the growth of the culture.

22. A process for producing L-glutamic acid and alpha-ketoglutaric acid which comprises culturing the micro-organism *Arthrobacter roseoparaffinus* under aerobic conditions in an aqueous nutrient medium containing at least one normal-paraffin as the major source of carbon, and recovering the L-glutamic acid and alpha-ketoglutaric acid thus produced.

23. The process of claim 22, wherein said normal-paraffin contains from 11 to 18 carbon atoms.

24. The process of claim 22, wherein the pH of said medium is maintained at from 6 to 8.

25. The process of claim 22, wherein a source of nitrogen is added to said medium to increase the yield of said L-glutamic acid.

26. A process for producing L-glutamic acid and alpha-ketoglutaric acid which comprises culturing the micro-organism *Arthrobacter roseoparaffinus* under aerobic conditions in an aqueous nutrient medium containing a source of nitrogen and at least one normal-paraffin as the major source of carbon, and recovering the L-glutamic acid and alpha-ketoglutaric acid thus produced.

27. The process of claim 26, wherein said normal-paraffin contains from 11 to 18 carbon atoms.

28. The process of claim 26, wherein an organic nitrogen source selected from the group consisting of corn steep liquor and meat extract is added to said medium to promote the growth of the culture.

29. A process for producing L-glutamic acid and alpha-ketoglutaric acid which comprises culturing the micro-organism *Arthrobacter hydrocarboglutamicus* under aerobic conditions in an aqueous nutrient medium containing at least one normal-paraffin as the major source of carbon, and recovering the L-glutamic acid and alpha-ketoglutaric acid thus produced.

30. The process of claim 29, wherein said normal-paraffin contains from 11 to 18 carbon atoms.

31. The process of claim 29, wherein the pH of said medium is maintained at from 6 to 8.

32. The process of claim 29, wherein a source of nitrogen is added to said medium to increase the yield of said L-glutamic acid.

33. A process for producing L-glutamic acid and alpha-ketoglutaric acid which comprises culturing the micro-organism *Arthrobacter hydrocarboglutamicus* containing a source of nitrogen and at least one normal-paraffin as the major source of carbon, and recovering the L-glutamic acid and alpha-ketoglutaric acid thus produced.

34. The process of claim 33, wherein said normal-paraffin contains from 11 to 18 carbon atoms.

35. The process of claim 33, wherein an organic nitrogen source selected from the group consisting of corn steep liquor and meat extract is added to said medium to promote the growth of the culture.

* * * * *